(12) United States Patent
Konuma et al.

(10) Patent No.: US 7,627,822 B2
(45) Date of Patent: Dec. 1, 2009

(54) IMAGE FORMING APPARATUS

(75) Inventors: Shigeo Konuma, Hachioji (JP); Kimikazu Saitoh, Hachioji (JP); Tadashi Tenda, Kunitachi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 617 days.

(21) Appl. No.: 11/247,864

(22) Filed: Oct. 11, 2005

(65) Prior Publication Data
US 2006/0290658 A1    Dec. 28, 2006

(30) Foreign Application Priority Data
Jun. 28, 2005    (JP)    ............................. 2005-188129

(51) Int. Cl.
*G06F 3/00* (2006.01)
*G06F 3/048* (2006.01)

(52) U.S. Cl. ....................... 715/710; 715/808; 715/809; 715/810; 715/823; 715/831

(58) Field of Classification Search ......... 715/808–810, 715/710, 823, 831
See application file for complete search history.

(56) References Cited

U.S. PATENT DOCUMENTS

| | | | | |
|---|---|---|---|---|
| 5,079,723 A | * | 1/1992 | Herceg et al. | 715/810 |
| 5,119,079 A | * | 6/1992 | Hube et al. | 715/823 |
| 5,604,860 A | * | 2/1997 | McLaughlin et al. | 715/866 |
| 5,678,135 A | * | 10/1997 | Fukui et al. | 399/77 |
| 5,726,883 A | * | 3/1998 | Levine et al. | 700/83 |
| 5,854,693 A | * | 12/1998 | Yoshiura et al. | 358/468 |
| 6,118,546 A | * | 9/2000 | Sanchez et al. | 358/1.6 |
| 6,134,019 A | * | 10/2000 | Wantuck, Jr. et al. | 358/1.15 |
| 6,278,526 B1 | * | 8/2001 | Kurozasa | 358/1.15 |
| 6,433,801 B1 | * | 8/2002 | Moon et al. | 715/840 |
| 6,618,061 B2 | * | 9/2003 | Yamamoto | 715/817 |
| 6,633,413 B1 | * | 10/2003 | Schlank et al. | 358/468 |
| 6,657,645 B2 | * | 12/2003 | Costea et al. | 715/805 |
| 6,667,811 B1 | * | 12/2003 | Katahira | 358/1.14 |
| 7,039,876 B2 | * | 5/2006 | Lavendel et al. | 715/777 |
| 7,062,721 B2 | * | 6/2006 | Jin | 715/843 |
| 2003/0058285 A1 | * | 3/2003 | Jin | 345/810 |
| 2004/0196267 A1 | | 10/2004 | Kawai et al. | |

(Continued)

FOREIGN PATENT DOCUMENTS

EP    0 476 972 B1    5/1998

(Continued)

*Primary Examiner*—Ting Zhou
*Assistant Examiner*—Ashraf Zahr
(74) *Attorney, Agent, or Firm*—Frishauf, Holtz, Goodman & Chick, P.C.

(57) ABSTRACT

An image forming apparatus includes a display unit, a plurality of types of input units, an input unit recognizing unit that recognizes a type of input unit via which input is being performed, and a display control unit. If a function menu has been selected of the first screen via the input unit, the display control unit displays a second screen, on the display unit, for selecting an item in the function menu selected on the first screen. Herein, based on a type of input unit recognized by the input unit recognizing unit when the function menu was selected on the first screen, the display control unit displays the second screen that corresponds to the recognized input unit on the display unit.

10 Claims, 10 Drawing Sheets

U.S. PATENT DOCUMENTS

2004/0239621 A1  12/2004  Numano
2006/0167573 A1* 7/2006  Yamada ..................... 700/83

FOREIGN PATENT DOCUMENTS

| | | |
|---|---|---|
| EP | 1 450 239 A2 | 8/2004 |
| GB | 2 329 813 A | 3/1999 |
| JP | 01-149119 A | 6/1989 |
| JP | 04-182818 A | 6/1992 |
| JP | 8-101759 A | 4/1996 |
| JP | 2003-058318 A | 2/2003 |

* cited by examiner

US 7,627,822 B2

IMAGE FORMING APPARATUS

FIELD OF THE INVENTION

The present invention relates to an image forming apparatus.

BACKGROUND OF THE INVENTION

In recent years, image forming devices, such as copier, printer, tend to be multifunctional, and more types of setting screen for setting various functions and execution conditions have been introduced. On the other hand, as the size of the display area of a display section is limited, methods are employed which, for example, display a setting screen of each hierarchy by replacing the screen, or displays pop-up display which is a kind of low hierarchy display.

Further, there is offered an electronic device that has a plurality of input units and selects the type of input area, corresponding to the type of input unit via which input is being performed (for example, Patent Document 1). In this electronic device, for example, if an input has been performed via a mouse, small icons are displayed at a narrow distance between input areas and neighboring to each other, and if an input has been performed via a touch panel, large icons are displayed at a wide distance between input areas and neighboring to each other.

[Patent Document 1] TOKKAI No. H08-101759

However, in the case of a touch panel, a user presses an item to be an object, and the display state of the item is changed. Thus, the user recognizes that the selected item has been accepted. On the other hand, in the case of a mouse, since a cursor moves on a screen, and the user can recognize the item at the position of the cursor before selecting an item by clicking. In such a manner, a mouse and a touch panel have different processes for deciding an item in selecting an item. Therefore, it is desirable that an optimistic screen is displayed, corresponding to the type of input unit.

SUMMARY OF THE INVENTION

An object of the invention is to provide an image forming apparatus that can improve operability, in accordance with an input unit.

In an aspect of the invention, an image forming apparatus includes a display unit, a plurality of types of input units, an input unit recognizing unit that recognizes a type of input unit via which input is being performed, and a display control unit that displays a first screen, on the display unit, for selecting a function menu to be set from a plurality of function menus, and if a function menu has been selected on the first screen via the input unit, displays a second screen, on the display unit, for selecting an item from a plurality of items in the function menu selected on the first screen, wherein, based on a type of input unit recognized by the input unit recognizing unit when the function menu was selected on the first screen, the display control unit displays the second screen that corresponds to the recognized input unit on the display unit.

In another aspect of the invention, an image forming apparatus includes a display unit, a plurality of types of input units, an input unit recognizing unit that recognizes a type of input unit via which input is being performed, and a display control unit that displays a first screen, on the display unit, for selecting a function menu to be set from a plurality of function menus, and if a function menu has been selected on the first screen via the input unit, displays a second screen, on the display unit, for selecting an item from a plurality of items in the function menu selected on the first screen, wherein, based on a type of input unit recognized by the input unit recognizing unit when the function menu was selected on the first screen, the display control unit recognizes whether or not to replace the second screen with another screen in accordance with item selection on the second screen.

In still another aspect of the invention, an image forming apparatus includes a display unit, a plurality of types of input units, an input unit recognizing unit that recognizes a type of input unit via which input is being performed, and a display control unit that displays a first screen, on the display unit, for selecting a function menu to be set from a plurality of function menus, and if a function menu has been selected on the first screen via the input unit, displays a second screen, on the display unit, for selecting an item from a plurality of items in the function menu selected on the first screen, wherein, based on a type of input unit recognized by the input unit recognizing unit when an item was selected on the second screen, the display control unit recognizes whether or not to replace the second screen with another screen, in accordance with item selection on the second screen.

In yet another aspect of the invention, an image forming apparatus includes a display unit, a plurality of types of input units, an input unit recognizing unit that recognizes a type of input unit via which input is being performed, and a display control unit that displays a first screen, on the display unit, for selecting a function menu to be set from a plurality of function menus, and if a function menu has been selected on the first screen via the input unit, displays a second screen, on the display unit, for selecting an item from a plurality of items in the function menu selected on the first screen, wherein, based on a type of input unit recognized by the input unit recognizing unit when a function menu was selected on the first screen, the display control unit recognizes whether or not to decide the item, in accordance with item selection on the second screen.

In this specification, "to decide the item selection" and "to decide the item" means the same, that is, "to decide to execute the selected item".

In still another aspect of the invention, an image forming apparatus includes a display unit, a plurality of types of input units, an input unit recognizing unit that recognizes a type of input unit via which input is being performed, and a display control unit that displays a first screen, on the display unit, for selecting a function menu to be set from a plurality of function menus, and if a function menu has been selected on the first screen via the input unit, displays a second screen, on the display unit, for selecting an item from a plurality of items in the function menu selected on the first screen, wherein, based on a type of input unit recognized by the input unit recognizing unit when an item was selected on the second screen, the display control unit recognizes whether or not to decide the item, in accordance with item selection on the second screen.

PREFERRED EMBODIMENTS OF THE INVENTION

First Embodiment

Figure 1:
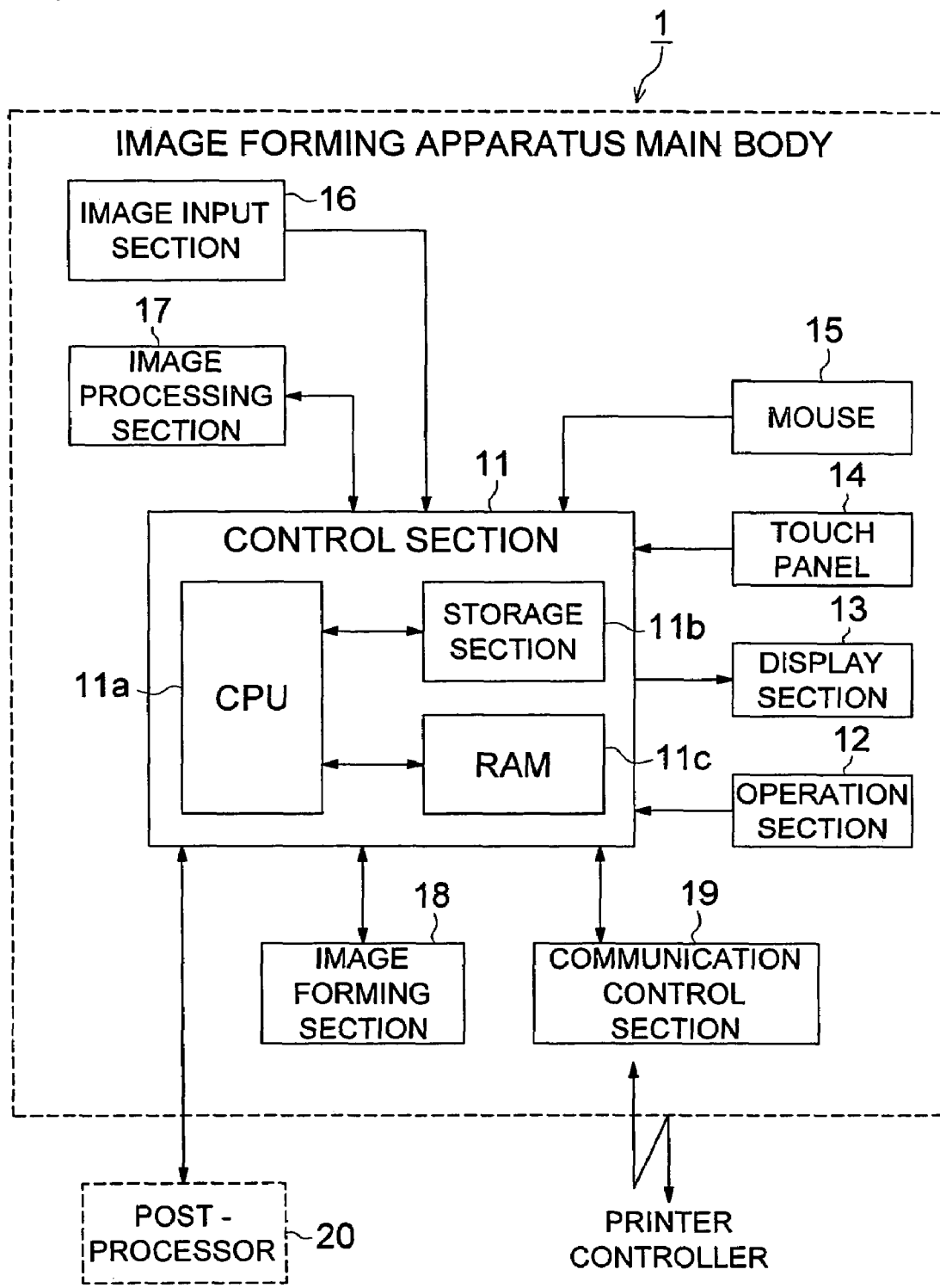
FIG. 1 is a block diagram showing a functional structure of an image forming apparatus 1 in a first embodiment.

A first embodiment in accordance with the invention will be described below, referring to the drawings.

FIG. 1 shows a functional structure of an image forming apparatus 1 in a first embodiment. The image forming apparatus 1 is, for example, an electrophotographic type copier, and, as shown in FIG. 1, configured with a control section 11, an operation section 12, a display section 13, a touch panel 14, a mouse 15, an image input section 16, an image processing section 17, an image forming section 18, a communication control section 19, a post-processor 20, and the like. Herein, the respective sections are connected by a bus.

The control section 11 is configured with a CPU (Central Processing Unit) 11a, a storage section 11b, a RAM (Random Access Memory) 11c, and the like.

With operations via the operation section 12, and the touch panel 14 or the mouse 15, the CPU 11a of the control section 11 reads out a system program and various processing programs stored in the storage section 11b, opens the programs into the RAM 11c, and performs centralized control of operations of the respective sections of the image forming apparatus 1. Further, the CPU 11a performs various processes including the image display control process A, according to the opened programs.

The CPU 11a recognizes the type of an input unit, such as the touch panel 14 or the mouse 15, via which input is being performed. In such a way, collaboration between the CPU 11a and programs realizes an input unit recognizing unit.

Further, the CPU 11a displays the first screen for selection of a function menu to be set, from a plurality of function menus, on the display section 13, and then displays, on the display section 13, a second screen for selection of an item from a plurality of items in the function menu selected on the first screen. Still further, based on the input unit recognition result obtained when a function menu was selected on the first screen, the CPU 11a displays a second screen that corresponds to the input unit on the display section 13. Yet further, based on the input unit recognition result obtained when the function menu was selected on the first screen, the CPU 11a recognizes whether or not to replace the second screen with the first screen, corresponding to item selection on the second screen (associated with the selection operation of an item button). Still further, based on the input unit recognition result obtained when the function menu was selected on the first screen, the CPU 11a recognizes whether or riot to decide the item, in correspondence to item selection on the second screen. In such a way, collaboration between the CPU 11a and programs realizes a display control unit.

The storage section 11b is configured with a semiconductor nonvolatile memory and the like, and stores a system program that corresponds to the image forming apparatus 1, various processing programs including the screen display control process A program, various data, and others.

The RAM 11c forms a work area which temporarily stores the system program executed by the CPU 11a, various processing programs, data in processing in various processes, processed results, and the like.

The operation section 12 includes hard keys, such as numerical keys and a start key, and outputs each pressed signal by each key operation to the control section 11.

The display section 13 is configured with an LCD (Liquid Crystal Display), an EL display (Electroluminescence Display), a CRT (Cathode Ray Tube), or the like, and displays a state display of various setting screens or units and an operation state of each function, and the like on the display screen, according to a display signal inputted from the control section 11.

The touch panel 14 is an input unit for which transparent electrodes are disposed in a lattice shape to cover the screen of the display section 13. The touch panel 14 is an input unit which detects through a voltage value the XY coordinates of the position pressed by a finger, a touch pen, or the like, by a pressure-sensitive method (resistance membrane pressure method), and outputs a detected position signal to the control section 11 as an operation signal. The touch panel 14 is not limited to a pressure-sensitive type, and may be other electrostatic types, optical types, or the like.

The mouse 15 is an input unit for instruction to move or make a selection on a screen of the display section 13. The cursor displayed on the screen of the display section 13 moves associated with the motion of the mouse 15, and an item is selected by clicking.

The image input section 16 includes a scanner under a contact glass on which a document is loaded, and reads the image of the document. The scanner includes a light source, a CCD (Charge Coupled Device), and the like. The scanner forms the reflected light of the light which is projected and scanned on the document from the light source, into an image, performs photoelectric conversion on the image to read the image of the document, converts the read image into digital image data by an A/D converter, and outputs the digital image data to the image processing section 17.

The image processing section 17 performs image processing, such as space filtering, enlarging/reducing, rotation, tone correction on image data inputted from the image input section 16 and outputs the image data to the image forming section 18. Further, the image processing section 17 converts printer codes inputted from the communication control section 19 into binary codes, and outputs the converted image data to the image forming section 18.

The image forming section 18 includes a pulse width modulator, laser light source, photosensitive drum, electric charger, developing device, sheet supply section, sheet ejecting section, fixing device, and the like, performs pulse width modulation on the image data inputted from the image processing section 17 by the pulse width modulator to generate a laser beam, irradiates the laser beam on the surface of the photosensitive drum charged by the electric charger, and thus forms an electrostatic latent image. Further, the image forming section 18 adheres toner to an area which includes the electrostatic latent image on the surface of the photosensitive drum by the developing device, conveys a printing sheet with a designated size and direction, transfers the toner onto the conveyed printing sheet and fixes the toner, and then ejects the printing sheet from the sheet ejecting section.

The communication control section 19 includes an interface connectable to a transmission medium connected with a communication network, such as a LAN (Local Area Network), WAN (Wide Area Network). The communication control section 19 is, for example, configured with a communication control card such as a LAN card, and performs transmitting and receiving of control signals and various data, such as printer codes, to and from an external device, such as a printer controller connected with a communication network via a communication line such as a LAN cable.

The post-processor 20 performs staple operation, punch hole making operation, sorting operation, and the like on recording mediums formed with an image, based on control signals from the control section 11.

Next, operations in the present embodiment will be described.

Figure 2:
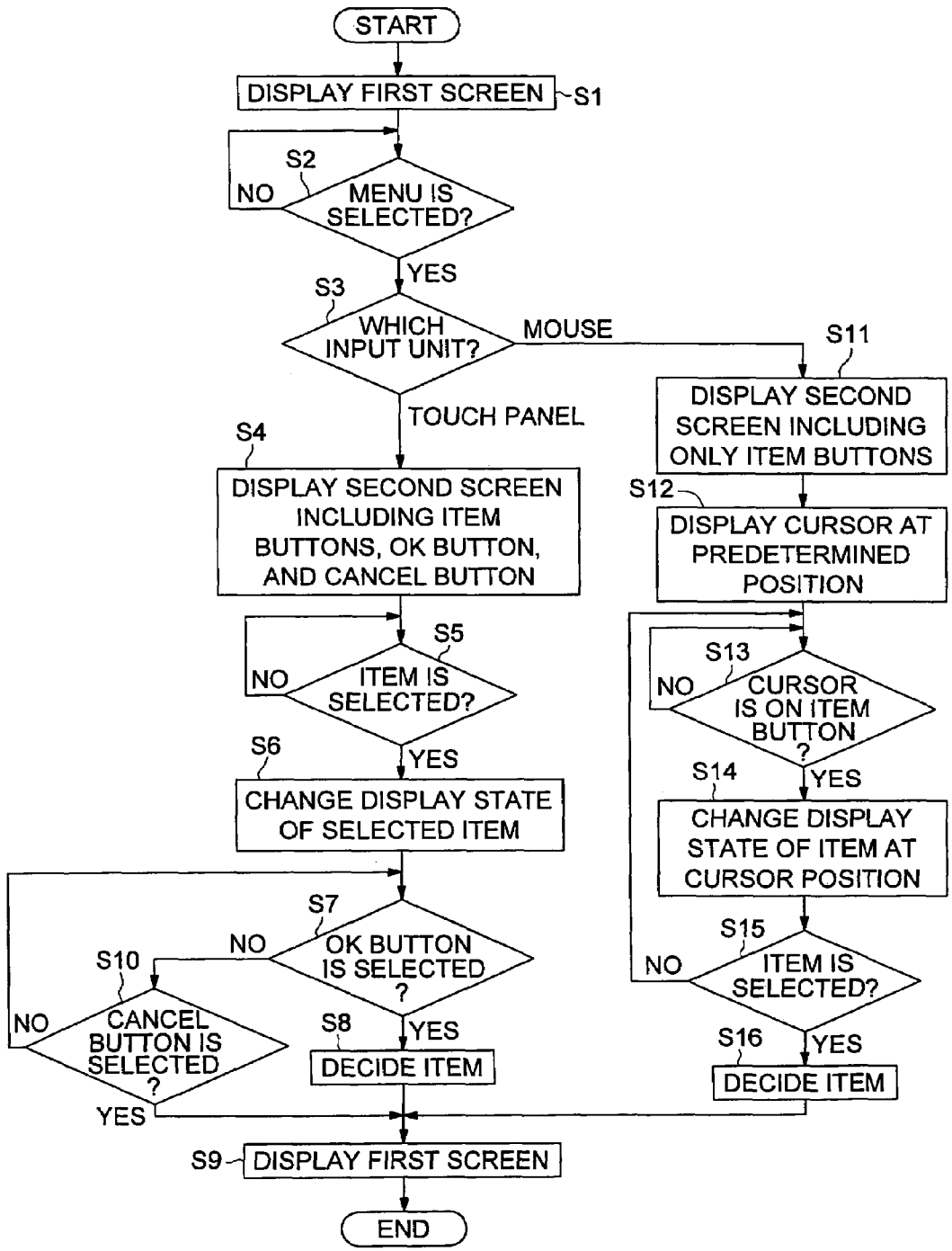
FIG. 2 is a flowchart showing a screen display control process A.

FIG. 2 shows the image display control process A executed by the control section 11. This process is realized through software processing by collaboration between the CPU 11a and programs stored in the storage section 11b.

Figure 3:
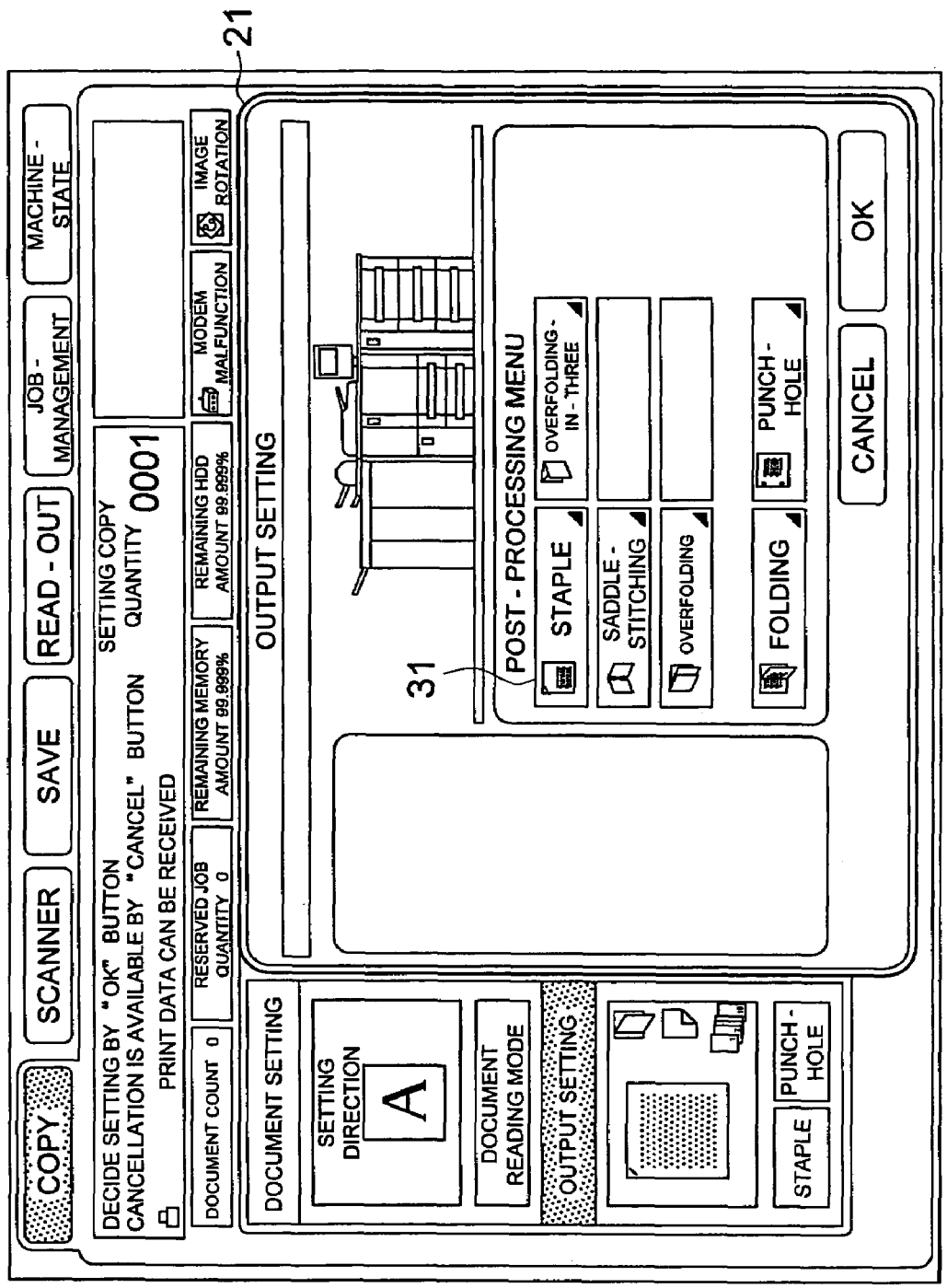
FIG. 3 is a diagram showing an example of an output setting screen 21.

First, the first screen for selection of a function menu to be set from a plurality of function menus is displayed on the display screen of the display section 13 (step S1). FIG. 3 shows an output setting screen 21, as a display example of the first screen. As shown in FIG. 3, buttons for selection of a function menu, such as "staple", "saddle-stitching", "overfolding", "overfolding in three", "folding", "punch hole", are displayed on the output setting screen 21.

Next, when a menu is selected via an input unit which is the touch panel 14 or the mouse 15 (step S2; YES), it is recognized whether the input unit via which the selection has been performed is the touch panel 14 or the mouse 15 (step S3).

If the input unit at the selection of a menu on the first screen is the touch panel 14 (step S3; touch panel), then a second screen is displayed which is a setting screen of the selected function menu. The second screen is one that displays items on the hierarchy next to the first screen and is used to select an item from a plurality of items on the function menu selected on the first menu. On the second screen, a button (OK button) for deciding item selection and a button (cancel button) for cancellation are displayed in addition to item buttons (step S4).

Figure 4:
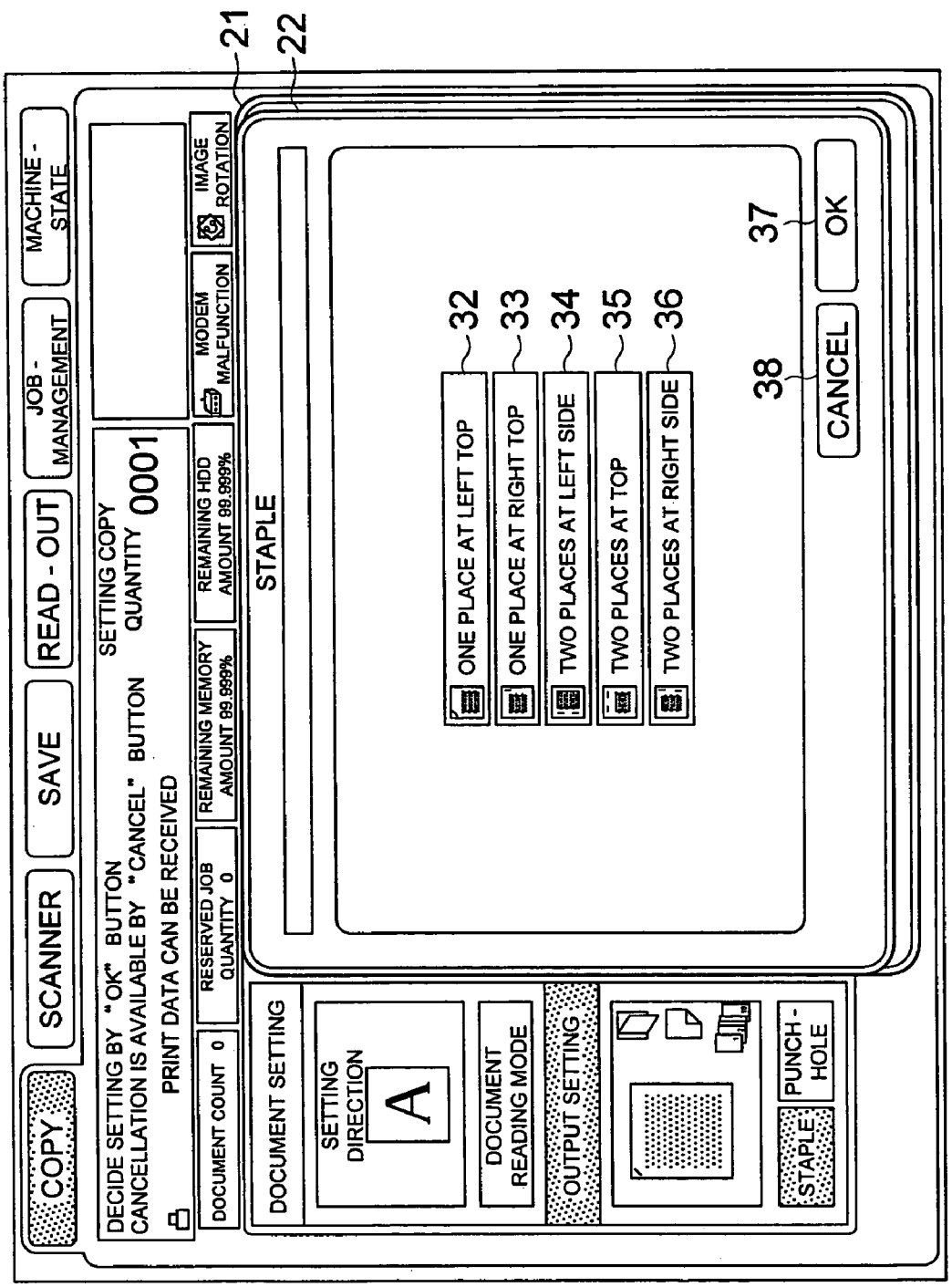
FIG. 4 is a diagram showing an example of a setting screen 22 for a staple function.

For example, if a "staple" button 31 is selected via the touch panel 14 on the output setting screen 21, shown in FIG. 3, a setting screen 22 for a staple function is displayed, as shown in FIG. 4. On the setting screen 22 for the staple function, there are displayed a "one place at the left top" button 32, "one place at the right top" button 33, "two places at the left" button 34, "two places at the top" button 35, "two places at the right" button 36, and in addition, an OK button 37 and a cancel button 38.

Figure 5:
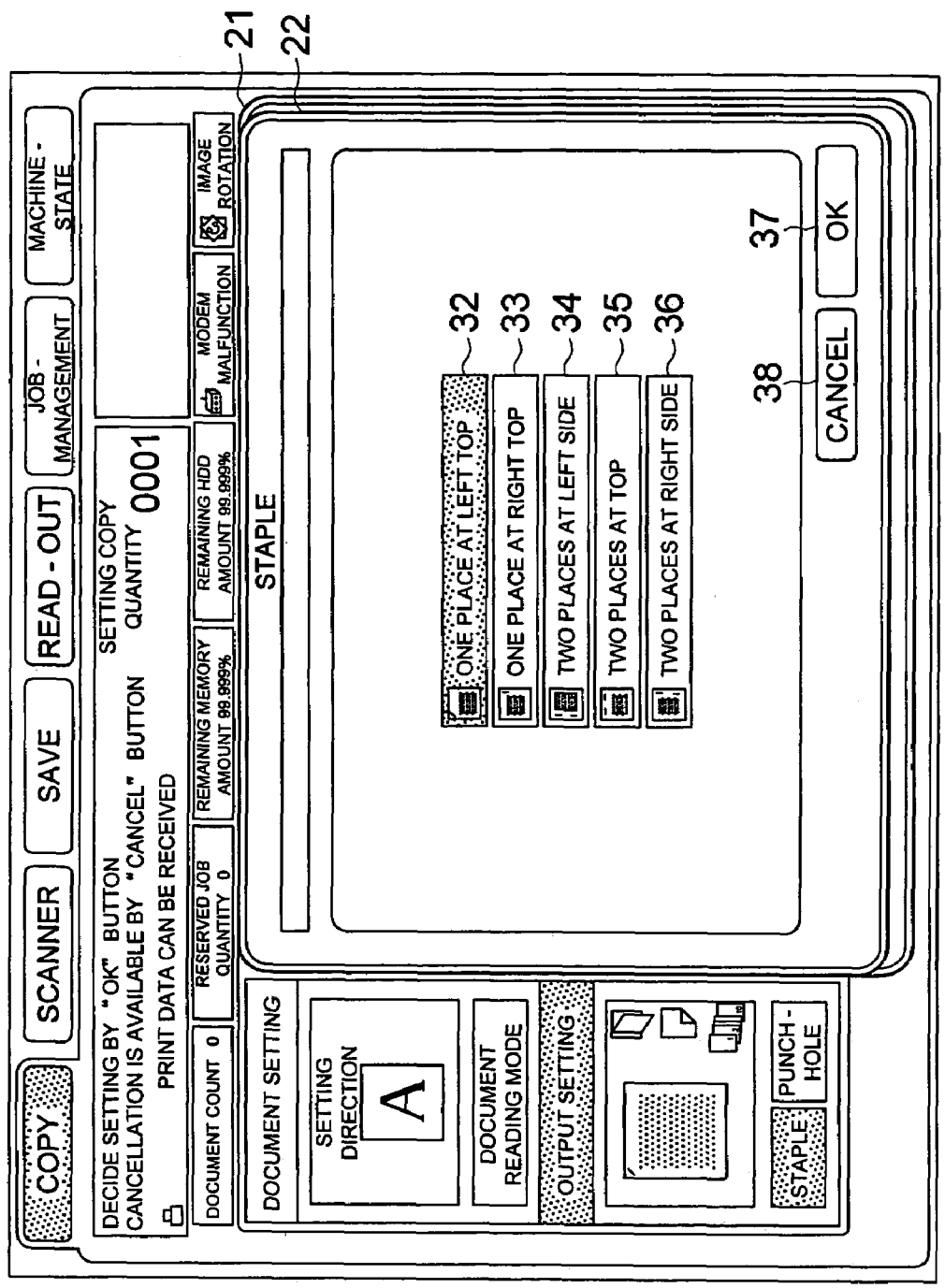
FIG. 5 is a diagram showing an example in a case where a "one place at the left top" button 32 is selected on the setting screen 22 for the staple function.

Next, if item selection is performed on the second screen (step S5; YES), the display state of the selected item on the screen is changed, while the display of the second screen is maintained (step S6). For example, on the setting screen 22 for the staple function, shown in FIG. 4, if the "one place at the left top" button 32 is selected, the "one place at the left top" button 32 is displayed in a color different from other buttons, as shown in FIG. 5. Incidentally, a selected item button may be reversely displayed.

On the second screen, if any one item is selected and the OK button is selected (step S7; YES), the item is decided (step S8), the first screen is displayed on the display section 13 (step S9), and then the processing is terminated.

On the second screen, if the cancel button is selected (step S7; NO, step S10; YES), the setting on the second screen is canceled, and the first screen is displayed on the display section 13 (step S9), and then the processing is terminated.

On the other hand, if the input unit at the menu selection on the first screen is the mouse 15 (step S3; mouse), a second screen which is a setting screen for the selected function menu is displayed, and only item buttons are displayed on the setting screen (step S11). Then, a cursor is displayed at a predetermined position on the second screen (step S12). On the second screen, if the cursor is located on any item button (step S13; YES), the display state of the item which is at the position pointed by the cursor is changed (step S14).

Figure 6:
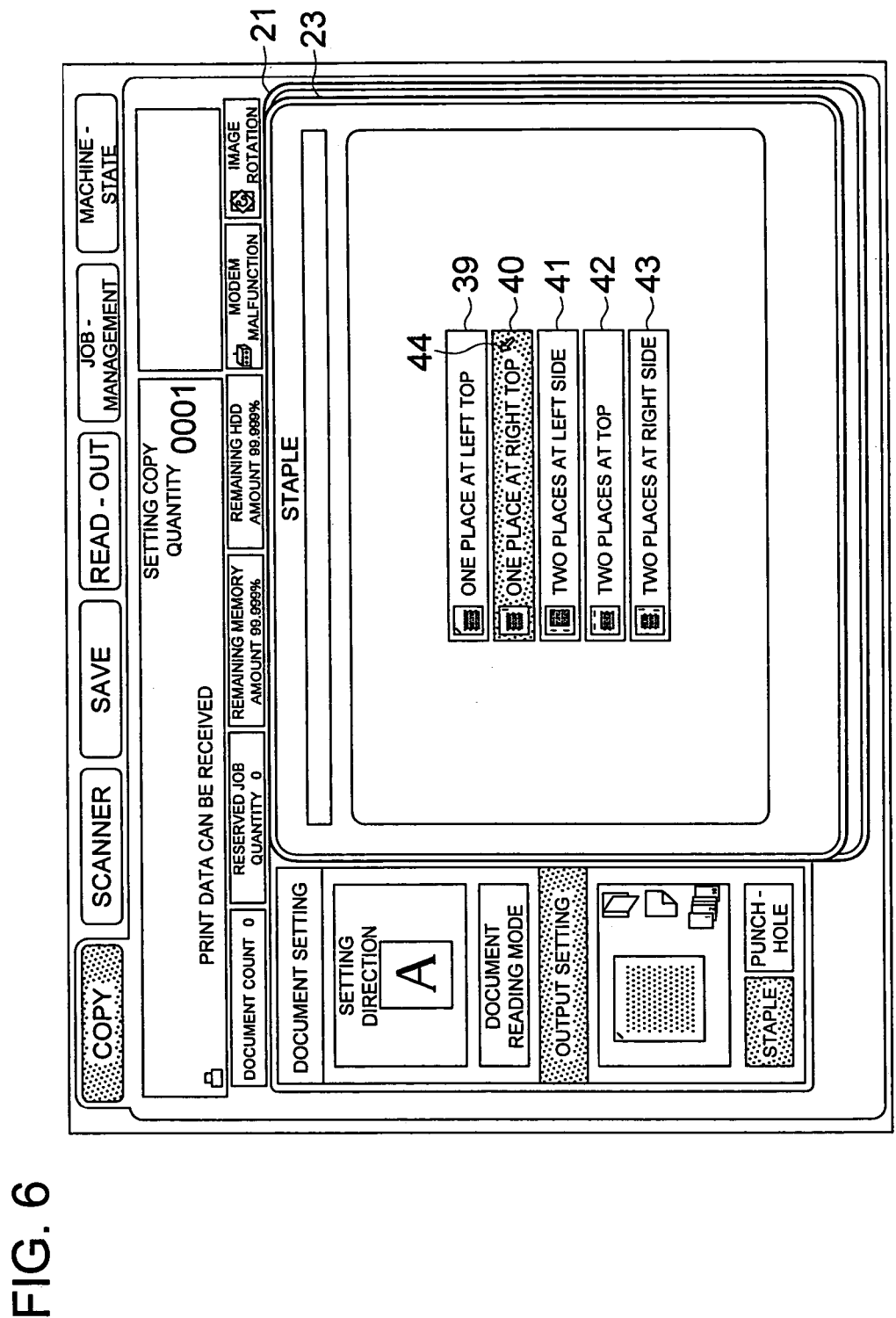
FIG. 6 is a diagram showing an example of a setting screen 23 for a staple function.

For example, if the "staple" button 31 is selected via the mouse 15 on the output setting screen 21, shown in FIG. 3, the setting screen 23 for a staple function is displayed, as shown in FIG. 6. On the setting screen 23 for the staple function, there are displayed a "one place at the left top" button 39, "one place at the right top" button 40, "two places at the left" button 41, "two places at the top" button 42, and "two places at the right" button 43. Further, a cursor 44 is displayed at a predetermined position on the setting screen 23 for the staple function. Herein, the predetermined position where the cursor 44 is displayed may be any position on the setting screen 23 for the staple function. However, an item which is frequently used is disposed at the head in most cases, the cursor 44 may be displayed at the position which points the head item (the "one place at the left top" button 39 in FIG. 6) of the displayed items. In the example shown in FIG. 6, since the cursor 44 is located on the "one place at the right top" button 40, the "one place at the right top" button 40 is displayed in a color different from other buttons. Incidentally, a selected item button may be reversely displayed.

Next, on the second screen, if item selection is made (step S15; YES), the item is decided corresponding to a selection operation with the item button (step S16), and the first screen is displayed on the display section 13 (step S9), then the processing is terminated.

As described above, based on whether the input unit which is used when a function menu is selected on the first screen is the touch panel 14 or the mouse 15, the image forming apparatus 1 displays a second screen which corresponds to the input unit. Thus, the operability can be improved.

If the input unit used for selection of a function menu on the first screen is the touch panel 14, then the OK button and the cancellation button are displayed in the second screen in addition to item buttons to prevent an operation the user does not intends. Accordingly, the user can confirm the item the user selected on the second screen, and thereafter can decide or cancel the item selection. Further, in accordance with an instruction to decide or cancel the item selection, the second screen can be replaced with the first screen.

If the input unit used for selection of a function menu on the first screen is the mouse 15, an item selection may be decided simultaneously with the item selection, and operability can be improved by removing unnecessary buttons for operation from the screen. Further, if the input unit is the mouse 15, the cursor can be displayed at a predetermined position, and thereby the user can easily recognize the position of the cursor, which improves the operability. Still further, by changing the display state of the item that the cursor is pointing, the user can confirm an item to select before selecting the item by clicking with the mouse 15, and thus a mistake in selection can be prevented.

Further, based on the type of the input unit used at the time of function menu selection, it is recognized whether to replace the second screen with the first screen in accordance with item selection on the second screen, which improves the operability. Still further, based on the type of the input unit, it is determined whether or not to decide the item in accordance with item selection on the second screen, which improves the operability. If the input unit is the mouse 15, an item selection may be decided simultaneously with the item selection, which reduces operation, compared with a case of carrying out operation for deciding an item selection.

Second Embodiment

Next, a second embodiment in accordance with the invention will be described. In an image forming apparatus in the second embodiment, the same structural elements as those of the image forming apparatus 1 described in the first embodiment are given with the same symbols, and illustration and description of those structures are omitted. In the following, structures and processes characterized in the second embodiment will be described.

If the input unit used for selection of a function menu on the first screen is a mouse 15, a CPU 11a displays item buttons, on a second screen, in a smaller size than the function menu buttons on the first screen. Further, if the input unit for selection of a function menu on the first screen is the mouse 15, the CPU 11a displays the second screen in a region outside the display area of the function menu button selected on the first screen.

Next, operations in the present embodiment will be described.

Figure 7:
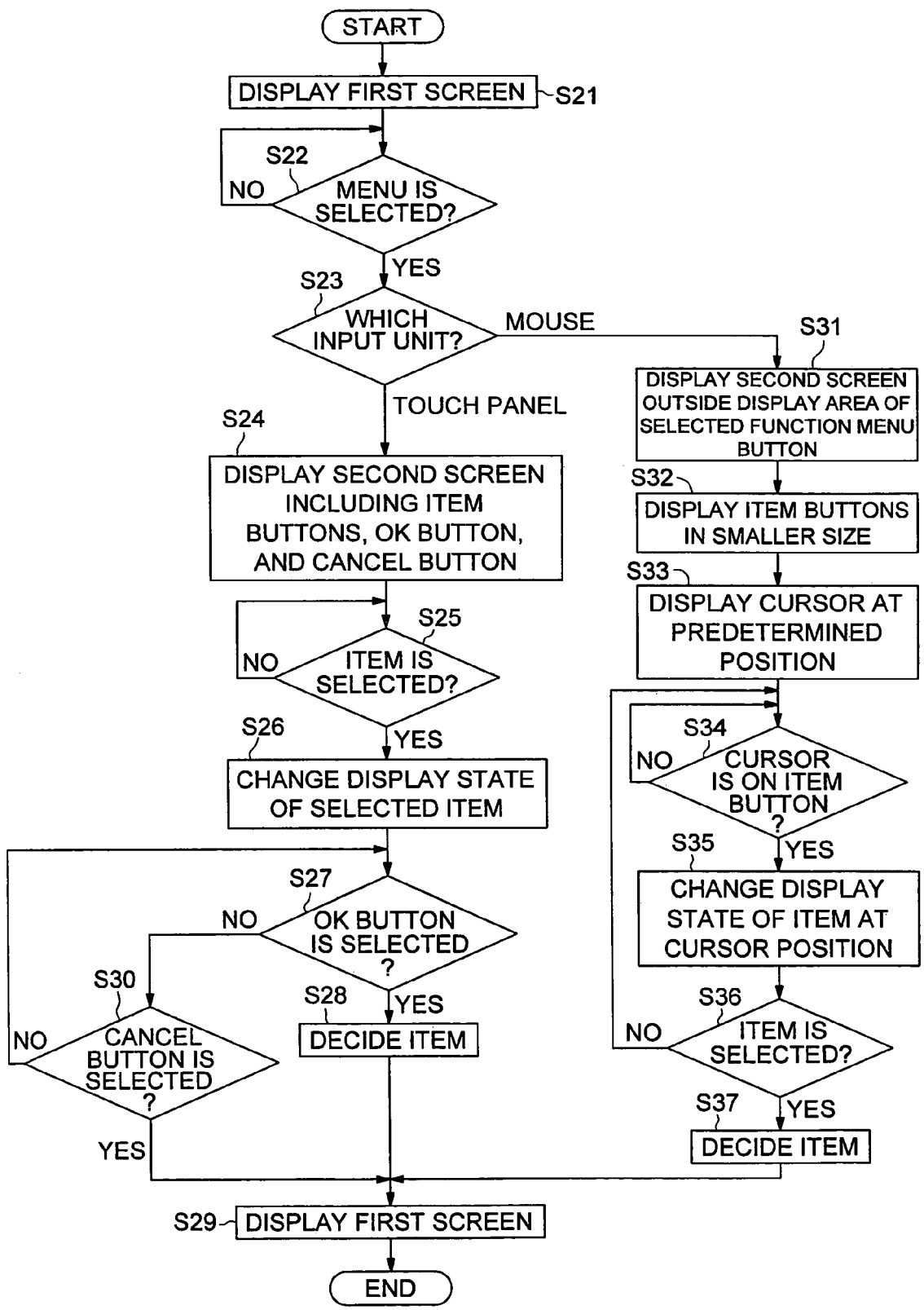
FIG. 7 is a flowchart showing a screen display control process B in a second embodiment.

FIG. 7 shows image display control process B executed by a control section 11. This process is realized through software processing by collaboration between the CPU 11a and programs stored in a storage section 11b.

In the image display control process B, shown in FIG. 7, steps S21 to S30 are the same as the steps S1 to S10, shown in FIG. 2, and accordingly description of them is omitted.

In step S23, if the input unit used for menu selection on the first screen is the mouse 15 (step S23; mouse), a second screen which is a setting screen of the selected function menu is displayed in a region outside the display area of the function menu selected on the first screen (step S31). On the second screen, item buttons in a smaller size than the function menu buttons on the first screen are displayed on the second screen (step S32). A cursor is displayed at a predetermined position on the second screen (step S33). On the second screen, if the cursor is located on any item button (step S34; YES), the display state of the item at the position which the cursor is pointing is changed (step S35).

Figure 8:
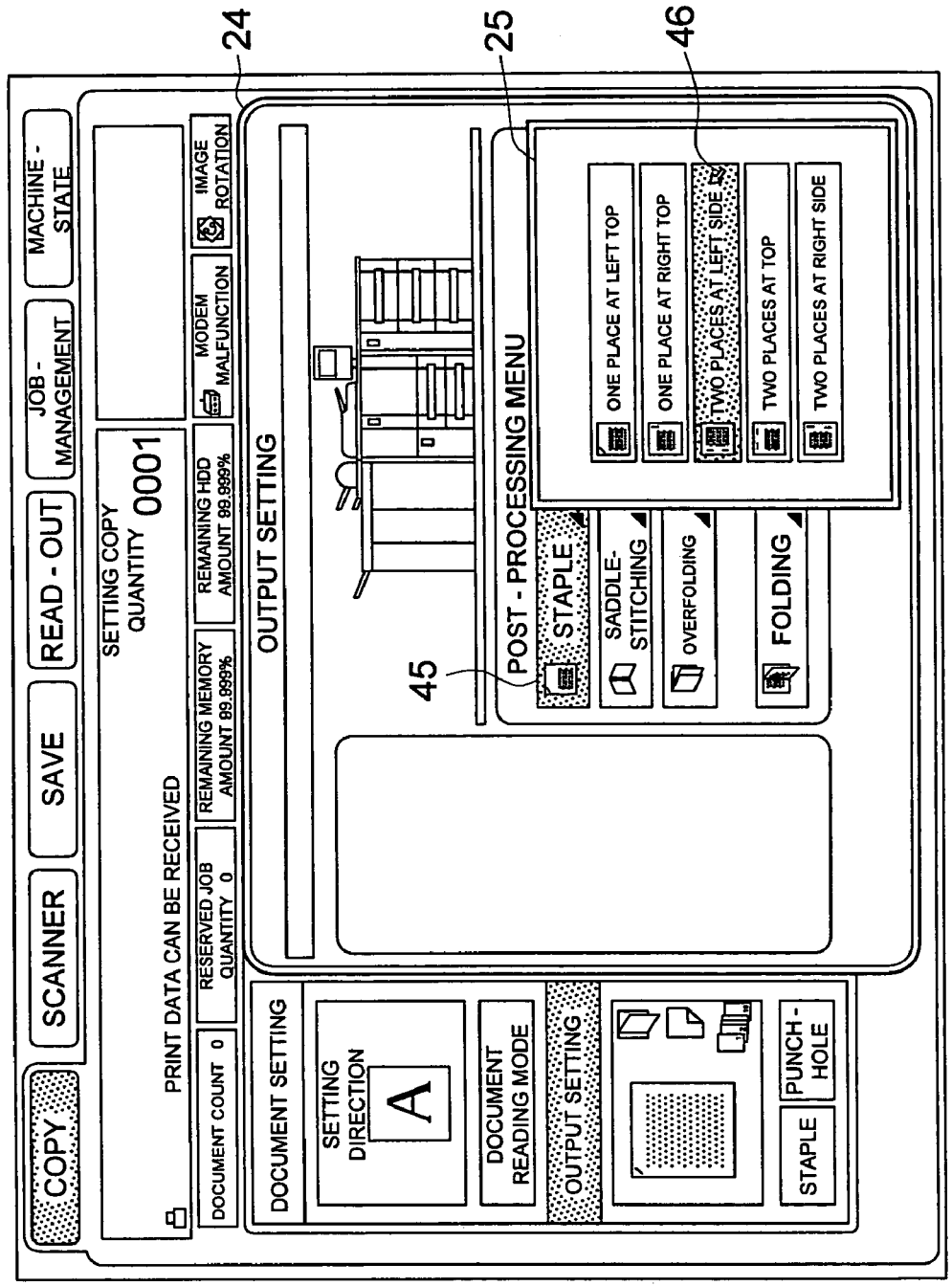
FIG. 8 is a diagram showing an example of an output setting screen 24 and a setting screen 25 for a staple function.
Figure 9:
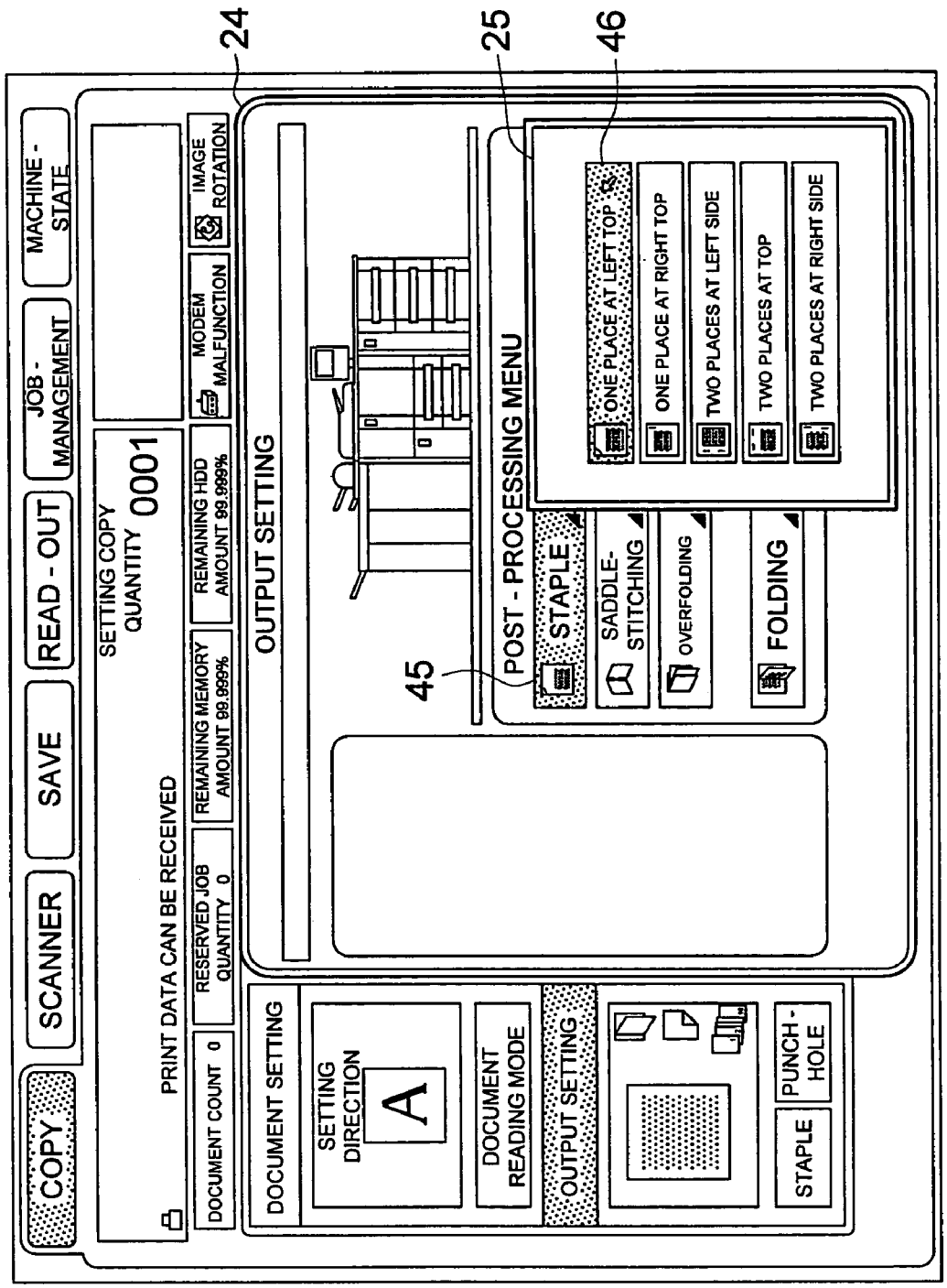
FIG. 9 is a diagram showing an example of the output setting screen 24 and the setting screen 25 for a staple function.

For example, as shown in FIG. 8, if a "staple" button 45 is selected via the mouse 15 on an output setting screen (the first screen) 24, as shown in FIG. 8, a setting screen 25 for the staple function is displayed in a region outside the display area of the "staple" button 45. Item buttons ("one place at the left top" button, "one place at the right top" button, and the like) on the setting screen 25 for this staple function are displayed in a smaller size than function menu buttons ("staple button", "saddle stitching" button, and the like) on the output setting screen 24. The cursor 46 is displayed at a predetermined position on the setting screen 25 of the staple function. Herein, the predetermined position where the cursor 46 is displayed may be any position on the setting screen 25 for the staple function, and the cursor 46 may be displayed at the position which the cursor 46 points the head item of the items, as shown in FIG. 9.

Next, on the second screen, if an item is selected (step S36; YES), the item is decided corresponding to the selection operation of the item button (step S37), the first screen is displayed on the display section 31 (step S29), and the processing is terminated.

As described above, by the image forming apparatus in the second embodiment, if the input unit used for selection of a function menu on the first screen is determined to be the mouse 15, a second screen is displayed in a region outside the display area of the function menu button selected on the first screen. Accordingly, the selected function menu button remains in the background and the content of the operation can be shown. Therefore, on the setting screen, the user can recognize what the user has set on the upper hierarchy screen and where the current setting operation is positioned in the entire setting operations which are to be made. Further, by displaying the item buttons in a smaller size than the function menu buttons, the background can have a wider area, which increases the degree of freedom for displaying, thereby improving the usability.

Third Embodiment

Next, a third embodiment in accordance with the invention will be described. In an image forming apparatus in the third embodiment, the same structural elements as those of the image forming apparatus 1 described in the first embodiment are given with the same symbols, and illustration and description of those structures are omitted. In the following, structures and processes characterized in the third embodiment will be described.

Based on the input unit recognition result at the selection of an item on the second screen and corresponding to item selection on the second screen, a CPU 11a recognizes whether or not to replace the second screen with the first screen. Further, based on the input unit recognition result at item selection on the second screen and in correspondence to item selection on the second screen, the CPU 11a recognizes whether or not to decide the item.

Next, operations in the present embodiment will be described.

Figure 10:
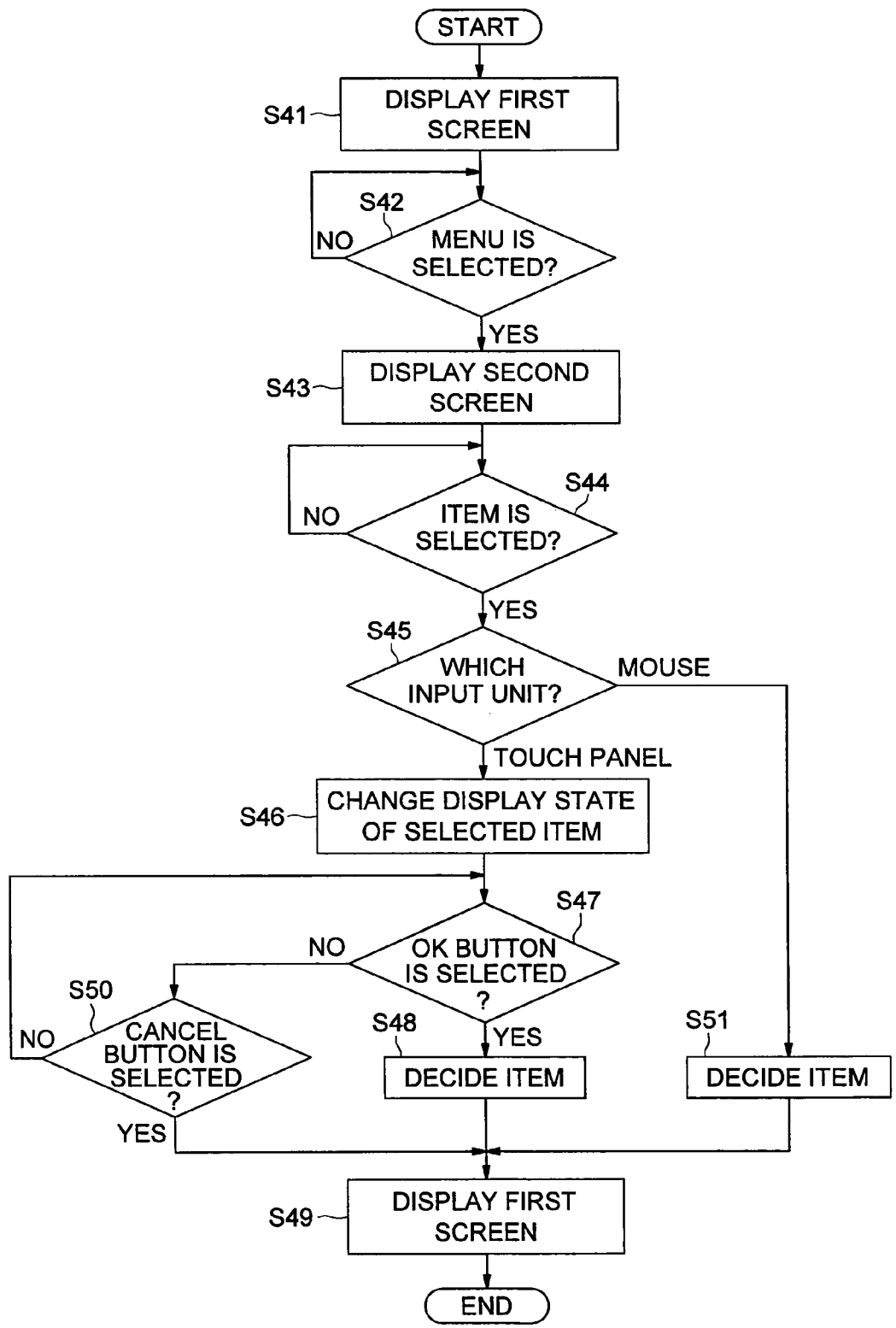
FIG. 10 is a flowchart showing a screen display control process C in a third embodiment.

FIG. 10 shows an image display control process C executed by a control section 11. This process is realized through software processing by collaboration between a CPU 11a and programs stored in a storage section 11b.

First, the first screen for selection of a function menu to be set from a plurality of function menus is displayed on the display screen of the display section 13 (step S41).

Next, if menu selection is performed via an input unit of a touch panel 14 or mouse 15 (step S42; YES), a second screen which is the setting screen for the selected function menu is displayed (step S43).

Next, on the second screen, if item selection is performed by an input unit of the touch panel 14 or mouse 15 (step S44; YES), it is determined whether the input unit via which the selection has been made is the touch panel 14 or the mouse 15 (step S45).

If the input unit used at the item selection on the second screen is the touch panel 14 (step S45; touch panel), while the display of the second screen is maintained, the display state of the selected item on the screen is changed (step S46).

If OK button is selected in a state where any one item is selected on the second screen (step S47; YES), the item is decided (step S48), the first screen is displayed on the display section 13 (step S49), and the processing is terminated.

On the second screen, if a cancel button is selected (step S47; NO, step S50; YES), setting on the second screen is cancelled, the first screen is displayed on the display section 13 (step S49), and the processing is terminated.

On the other hand, if the input unit used at item selection on the second screen is the mouse 25 (step S45; mouse), the item is decided corresponding to selection operation of the item button (step S51), the first screen is displayed on the display section 13 (step S49), and the processing is terminated.

As described above, in the image forming apparatus in the third embodiment, based on the type of input unit used at item selection, it is determined whether or not to replace the second screen with the first screen in accordance with item selection on the second screen, which improves the operability. Further, based on the type of input unit used at item selection on the second screen and in correspondence to item selection on the second screen, it is determined whether or not to decide the item, which improves the operability. If the input unit is the mouse 15, an item selection may be decided simultaneously with the item selection, and thus operation can be reduced, compared with the case of performing operation for deciding an item selection.

The invention includes the following structures.

(Structure 1)

An image forming apparatus includes a display unit, a plurality of types of input units, an input unit recognizing unit that recognizes a type of input unit via which input is being performed, and a display control unit that displays a first screen, on the display unit, for selecting a function menu to be set from a plurality of function menus. If a function menu has been selected on the first screen via the input unit, the display control unit displays a second screen, on the display unit, for selecting an item from a plurality of items in the function menu selected on the first screen. Herein, based on the type of the input unit recognized by the input unit recognizing unit when the function menu was selected on the first screen, the display control unit displays the second screen according to the recognized input unit on the display unit.

(Structure 2)

In the image forming apparatus of Structure 1, the second screen is a screen that displays items in a hierarchy next to the first screen.

(Structure 3)

In the image forming apparatus of Structure 1 or 2, the input units include a touch panel and a mouse.

(Structure 4)

In the image forming apparatus of Structure 3, when a function menu is selected on the first screen, if the input unit recognizing unit recognizes that the input unit via which input is being performed is a touch panel, the display control unit displays buttons in addition to item buttons on the second screen, for deciding an item selection or canceling the item selection.

(Structure 5)

In the image forming apparatus of Structure 4, when a function menu is selected on the first screen, if the input unit recognizing unit recognizes that the input unit via which input is being performed is a touch panel, the display control unit replaces the second screen with another screen, in accordance with selection of a button for deciding the item selection or canceling the item selection.

(Structure 6)

In the image forming apparatus of Structure 5, the another screen is the first screen.

(Structure 7)

In the image forming apparatus of any one of Structures 3 to 6, when a function menu is selected on the first screen, if the input unit recognizing unit recognizes that the input unit via which input is being performed is a mouse, the display control unit displays only item buttons on the second screen.

(Structure 8)

In the image forming apparatus of any one of Structures 3 to 7, when a function menu is selected on the first screen, if the input unit recognizing unit recognizes that the input unit via which input is being performed is a mouse, the display control unit displays the item buttons on the second screen in a smaller size than the function menu buttons on the first screen.

(Structure 9)

In the image forming apparatus of any one of Structures 3 to 8, when a function menu is selected on the first screen, if the input unit recognizing unit recognizes that the input unit via which input is being performed is a mouse, the display control unit displays the second screen in a region other than a display area of the function menu button selected on the first screen.

(Structure 10)

In the image forming apparatus of any one of Structures 3 to 9, when a function menu is selected on the first screen, if the input unit recognizing unit recognizes that the input unit via which input is being performed is a mouse, the display control unit displays a cursor at a predetermined position on the second screen.

(Structure 11)

In the image forming apparatus of Structure 10, the predetermined position is a position of a head item of items displayed on the second screen.

(Structure 12)

In the image forming apparatus of Structure 10 or 11, the display control unit changes a display state of an item which the cursor is pointing to on the second screen.

(Structure 13)

An image forming apparatus includes a display unit, a plurality of types of input units, an input unit recognizing unit that recognizes a type of input unit via which input is being performed, and a display control unit that displays a first screen, on the display unit, for selecting a function menu to be set from a plurality of function menus. If a function menu has been selected on the first screen via the input unit, the display control unit displays a second screen, on the display unit, for selecting an item from a plurality of items in the function menu selected on the first screen. Herein, based on the type of the input unit determined by the input unit recognizing unit when the function menu was selected on the first screen, the display control unit recognizes whether or not to replace the second screen with another screen in accordance with item selection on the second screen.

(Structure 14)

In the image forming apparatus of Structure 13, based on the type of the input unit recognized by the input unit recognizing unit when the function menu was selected on the first screen, the display control unit recognizes whether to replace the second screen with another screen or continue to display the second screen in accordance with item selection on the second screen.

(Structure 15)

In the image forming apparatus of Structure 13 or 14, the input units include a touch panel and a mouse.

(Structure 16)

In the image forming apparatus of Structure 15, when a function menu is selected on the first screen, if the input unit recognizing unit recognizes that the input unit via which input is being performed is a mouse, the display control unit replaces the second screen with another screen, in accordance with item selection on the second screen.

(Structure 17)

An image forming apparatus includes a display unit, a plurality of types of input units, an input unit recognizing unit that recognizes a type of input unit via which input is being performed, and a display control unit that displays a first screen, on the display unit, for selecting a function menu to be set from a plurality of function menus. If a function menu has been selected on the first screen via the input unit, the display control unit displays a second screen, on the display unit, for selecting an item from a plurality of items in the function menu selected on the first screen. Herein, based on the type of input unit determined by the input unit determining unit when an item was selected on the second screen, the display control unit recognizes whether or not to replace the second screen with another screen in accordance with item selection on the second screen.

(Structure 18)

In the image forming apparatus of Structure 17, based on the type of input unit recognized by the input unit recognizing unit when an item was selected on the second screen, the display control unit recognizes whether to replace the second screen with another screen or continue to display the second screen in accordance with item selection on the second screen.

(Structure 19)

In the image forming apparatus of Structure 17 or 18, the input units include a touch panel and a mouse.

(Structure 20)

In the image forming apparatus of Structure 19, when an item is selected on the second screen, if the input unit recognizing unit recognizes that the input unit via which input is being performed is a mouse, the display control unit replaces the second screen with another screen in accordance with item selection on the second screen.

(Structure 21)

In the image forming apparatus of any one of Structures 13 to 20, the another screen is the first screen.

(Structure 22)

An image forming apparatus includes a display unit, a plurality of types of input units, an input unit recognizing unit that recognizes a type of input unit via which input is being performed, and a display control unit that displays a first screen, on the display unit, for selecting a function menu to be set from a plurality of function menus. If a function menu has been selected on the first screen via the input unit, the display control unit displays a second screen, on the display unit, for selecting an item from a plurality of items in the function menu selected on the first screen. Herein, based on the type of input unit determined by the input unit determining unit when a function menu was selected on the first screen, the display control unit determines whether or not to decide the item in accordance with item selection on the second screen.

(Structure 23)

In the image forming apparatus of Structure 22, the input units include a touch panel and a mouse.

(Structure 24)

In the image forming apparatus of Structure 23, when a function menu is selected on the first screen, if the input unit recognizing unit recognizes that the input unit via which input is being performed is a mouse, the display control unit decides the item corresponding to item selection on the second screen.

(Structure 25)

An image forming apparatus includes a display unit, a plurality of types of input units, an input unit recognizing unit that recognizes a type of input unit via which input is being performed, and a display control unit that displays a first screen, on the display unit, for selecting a function menu to be set from a plurality of function menus. If a function menu has been selected on the first screen via the input unit, the display control unit displays a second screen, on the display unit, for selecting an item from a plurality of items in the function menu selected on the first screen. Herein, based on the type of input unit determined by the input unit determining unit when an item was selected on the second screen, the display control unit determines whether or not to decide the item in accordance with item selection on the second screen.

(Structure 26)

In the image forming apparatus of Structure 25, the input units include a touch panel and a mouse.

(Structure 27)

In the image forming apparatus of Structure 26, when an item is selected on the second screen, if the input unit recognizing unit recognizes that the input unit via which input is being performed is a mouse, the display control unit decides the item corresponding to item selection on the second screen.

EFFECTS OF THE INVENTION

According to Structure 1, since a second screen that corresponds to an input unit is displayed, operability can be improved.

According to Structure 2, since a screen which displays items on the hierarchy next to the first screen is displayed, based on the type of input unit, operability is improved.

According to Structure 3, based on whether the input unit is the touch panel or the mouse, since a second screen that corresponds to the input unit is displayed, operability is improved.

According to Structure 4, if input is performed via the touch panel, operation which is not intended by the user can be prevented. The user can decide or cancel the item selection after confirming a selected item on the second screen.

According to Structure 5, it is possible to replace the second screen with another screen, corresponding to an instruction to decide or cancel an item selection.

According to Structure 6, it is possible to replace the second screen with the first screen, corresponding to instruction to decide or cancel of an item.

According to Structure 7, if input is performed via the mouse, an item selection may be decided simultaneously with the item selection. Accordingly, by removing unnecessary buttons for operation from the screen, operability can be improved.

According to Structure 8, by displaying item buttons in a smaller size, the area for the background can be made wider. Accordingly, the degree of freedom for display increases to improve usability.

According to Structure 9, the selected function menu button can remain in the background, thereby the operation content can be displayed, and thus operability can be improved.

According to Structure 10, the user can easily recognize the position of the cursor, and thus operability can be improved.

According to Structure 11, since a frequently used item is disposed at the head in most cases, operability can be improved.

According to Structure 12, since it is possible to confirm an item to be selected before item selection via the mouse, a selection mistake can be prevented.

According to Structure 13, based on the type of input unit used at selection of function menu, it is determined whether or not to replace the second screen with another screen in accordance with item selection on the second screen. Thus, operability can be improved.

According to Structure 14, based on the type of input unit used at selection of function menu, it is determined whether to replace the second screen with another screen or continue to display the second screen in accordance with item selection on the second screen. Thus, operability can be improved.

According to Structure 15, based on whether the input unit is the touch panel or the mouse and corresponding to item selection on the second screen, it is possible to recognize whether or not to replace the second screen with another screen.

According to Structure 16, if input is performed via the mouse, decision of an item selection may be performed simultaneously with the item selection. Accordingly, operation can be reduced, compared with the case of performing operation for deciding an item selection.

According to Structure 17, based on the input device used at item selection and corresponding to item selection on the second screen, it is recognized whether or not to replace the second screen with another screen, and thus operability can be improved.

According to Structure 18, based on the input device at item selection, it is recognized whether to replace the second screen with another screen or continue to display the second screen in accordance with item selection on the second screen, and thus operability can be improved.

According to Structure 19, based on whether the input unit is the touch panel or the mouse, it is possible to recognize whether or not to replace the second screen with another screen in accordance with item selection on the second screen.

According to Structure 20, if input is performed via the mouse, decision of an item selection may be performed simultaneously with the item selection. Accordingly, operation can be reduced, compared with the case of performing operation for deciding an item selection.

According to Structure 21, based on the input unit, it is recognized whether or not to replace the second screen with the first screen in accordance with item selection on the second screen, and thus operability can be improved.

According to Structure 22, based on the input unit used at function menu selection, it is recognized whether or not to decide the item in accordance with item selection on the second screen, and thus operability can be improved.

According to Structure 23, based on whether the input unit is the touch panel or the mouse, it is possible to recognize whether or not to decide the item in accordance with item selection on the second screen.

According to Structure 24, if input is performed via the mouse, decision of an item selection may be performed simultaneously with the item selection, operation can be reduced, compared with the case of performing operation for deciding an item selection.

According to Structure 25, based on the type of input device used at item selection, it is recognized whether or not to decide the item in accordance with item selection on the second screen, and thus operability is improved.

According to Structure 26, based on whether the input unit is the touch panel or the mouse, it is possible recognized whether or not to decide the item in accordance with item selection on the second screen.

According to Structure 27, if input is performed via the mouse, decision of an item selection may be performed simultaneously with the item selection. Accordingly, operation can be reduced, compared with the case of performing operation for deciding an item selection.

The descriptions in the above respective embodiments are preferable examples of image forming apparatuses in accordance with the invention. However, the invention is not limited to these. Detailed structures of the respective sections which construct an image forming apparatus and detailed operations can be modified, as necessary, without deviating from the spirit of the invention.

For example, although in the above respective embodiments, the screen is replaced with the first screen after item selection is performed on the second screen, it may be that the screen may be replaced with a screen other than the first screen after item selection is performed on the second screen.

What is claimed is:

1. An image forming apparatus comprising:
a display to display (i) a first screen to select a function menu from a plurality of function menus and (ii) a second screen to select an item from a plurality of items in order to select a condition for the function menu selected on the first screen;
an input device having at least two types of input members including a touch panel and a mouse for inputting a selection of the function menu on the first screen and a selection of the item on the second screen; and
a control section to judge the type of the input member used to input the selection and to control the display;
wherein when the control section judges such that the touch panel has been used to input the selection of the function menu on the first screen, the control section controls the display to display (i) an item button, (ii) a decision button to decide the selection of the item and (iii) a cancel button to cancel the selection of the item on the second screen, and when the control section judges that the mouse has been used to input the selection of the function menu on the first screen, the control section controls the display to display only an item button on the second screen.

2. The image forming apparatus of claim 1, wherein the second screen is a next screen of the first screen in hierarchy level.

3. The image forming apparatus of claim 1, wherein when the cancel button is selected, the control section controls the display to transfer from the second screen to another screen.

4. The image forming apparatus of claim 3, wherein the another screen is the first screen.

5. The image forming apparatus of claim 1, wherein when the control section judges that the mouse has been used to input the selection of the function menu on the first screen, the control section controls the display to display on the second screen an item button smaller in size than a function menu button displayed on the first screen.

6. The image forming apparatus of claim 1, wherein when the control section judges that the mouse has been used to input a selection of a function menu on the first screen, the control section controls the display to display the second screen on a region other than the display area of a function menu button on the first screen.

7. The image forming apparatus of claim 1, wherein when the control section judges that the mouse has been used to input the selection of the function menu on the first screen, the control section controls the display to display a cursor at a predetermined position on the second screen.

8. The image forming apparatus of claim 7, wherein the predetermined position is a position of a leading item among the items displayed on the second screen.

9. The image forming apparatus of claim 7, wherein the control section controls the display to change a display condition of an item designated with the cursor.

10. The image forming apparatus of claim 1, wherein when the control section judges that the mouse has been used to input the selection of the function menu on the first screen, and when the mouse has been used to input the selection of the item on the second screen, the control section decides the selected item for the condition for the selected function menu.

* * * * *

UNITED STATES PATENT AND TRADEMARK OFFICE
CERTIFICATE OF CORRECTION

PATENT NO.       : 7,627,822 B2                                                    Page 1 of 1
APPLICATION NO. : 11/247864
DATED            : December 1, 2009
INVENTOR(S)      : Konuma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 830 days.

Signed and Sealed this

Second Day of November, 2010

David J. Kappos
*Director of the United States Patent and Trademark Office*